United States Patent
Tobey (10) Patent No.: US 8,364,312 B2
(45) Date of Patent: Jan. 29, 2013

(54) MODULAR ROTARY MULTI-SENSOR SENSOR RING

(75) Inventor: Wayland E. Tobey, Sauk City, WI (US)

(73) Assignee: Cycogs, LLC, Sauk City, WI (US)

( * ) Notice: Subject to any disclaimer, the term of this patent is extended or adjusted under 35 U.S.C. 154(b) by 1180 days.

(21) Appl. No.: 12/134,894

(22) Filed: Jun. 6, 2008

(65) Prior Publication Data

US 2009/0088896 A1    Apr. 2, 2009

Related U.S. Application Data

(60) Provisional application No. 60/942,345, filed on Jun. 6, 2007, provisional application No. 60/942,351, filed on Jun. 6, 2007.

(51) Int. Cl.
 *G05B 15/00* (2006.01)
 *G05B 19/00* (2006.01)

(52) U.S. Cl. .............. 700/258; 700/245; 318/568.12; 318/568.16; 318/400.37; 901/1; 901/10; 901/46

(58) Field of Classification Search ............ 700/245, 700/258; 901/46, 1, 10; 318/568.12, 568.16, 318/400.37
See application file for complete search history.

(56) References Cited

U.S. PATENT DOCUMENTS

| | | | |
|---|---|---|---|
| 4,330,874 A | 5/1982 | Sorwick | |
| 4,620,285 A | 10/1986 | Perdue | |
| 4,679,152 A | 7/1987 | Perdue | |
| 4,823,618 A | 4/1989 | Ramming | |
| 5,170,352 A | 12/1992 | McTamaney et al. | |
| 5,239,515 A * | 8/1993 | Borenstein et al. | 367/87 |
| 5,241,875 A | 9/1993 | Kochanneck | |
| 5,465,142 A | 11/1995 | Krumes et al. | |
| 5,467,003 A | 11/1995 | Kosaka et al. | |
| 5,525,882 A * | 6/1996 | Asaka et al. | 318/568.16 |
| 5,758,298 A * | 5/1998 | Guldner | 701/23 |
| 5,812,267 A | 9/1998 | Everett, Jr. et al. | |
| 6,496,755 B2 | 12/2002 | Wallach et al. | |
| 6,507,773 B2 | 1/2003 | Parker et al. | |
| 6,615,108 B1 | 9/2003 | Peless et al. | |
| 6,664,529 B2 | 12/2003 | Pack et al. | |
| 6,766,950 B2 | 7/2004 | Hall | |
| 6,870,792 B2 | 3/2005 | Chiappetta | |
| 6,969,176 B2 | 11/2005 | Pohle | |
| 7,054,716 B2 | 5/2006 | McKee et al. | |
| 7,155,308 B2 | 12/2006 | Jones | |
| 7,228,203 B2 | 6/2007 | Koselka et al. | |
| 2009/0259412 A1 * | 10/2009 | Brogardh | 702/41 |

OTHER PUBLICATIONS

Yata et al., A Fast and Accurate Sonar-ring Sensor for a Mobile Robot, May 1999, Proceedings of the 1999 IEEE International Conference on Robotics and Automation, pp. 630-636.*

Holenstein et al., Collision Avoidance in a Behavior-based Mobile Robot Design, Apr. 1991, Proceedings of the 1991 IEEE International Conference on Robotics and Automation Sacramento, California, pp. 898-903.*

Kopacck et al., Modular Service Robots—State of the Art and Future Trends, ICAR '97 Monterey, CA, Jul. 7-9, 1991, pp. 51-56.*

(Continued)

*Primary Examiner* — Khoi Tran
*Assistant Examiner* — Jamie Figueroa (57) ABSTRACT

An intelligent modular rotary multi-sensor sensor ring platform for such uses as in mobile robotics allows a few sensors to scan the local area and environment, provides a cost saving, volume and a power savings as well as reducing calibration and maintenance costs. The sensor ring platform has a large internal diameter allowing a maximum area for the chassis structural elements as well as other equipment located in the chassis. Local sensor signal processing is combined with time, rotation speed and position data stamps to allow processed data to be used locally as well as to be transferred to other systems or subsystems or for data logging purposes.

19 Claims, 5 Drawing Sheets

OTHER PUBLICATIONS

Koren et al., Potential Field Methods and Their Inherent Limitations for Mobile Robot Navigation, Proceedings of the 1991 IEEE International Conference on Robotics and Automation Sacramento. California—Apr. 1991, pp. 1398-1404.* www.cybermotion.com, now www.kinelogic.com; Jul. 15, 2007; retrieved Feb. 18, 2009 from archive.org.

www.willowgarage.com/blog; Feb. 4, 2008; retrieved Feb. 18, 2009 from archive.org.

www.seegrid.com/index.php; Feb. 10, 2008; retrieved Feb. 18, 2009 from archive.org.

International Preliminary Report on Patentability, PCT/US08/066151, Dec. 7, 2009.

* cited by examiner

MODULAR ROTARY MULTI-SENSOR SENSOR RING

This application claims priority to U.S. Provisional Applications 60/942,351 and 60/642,345 both filed Jun. 6, 2007, each of which is incorporated herein by reference in its entirety.

BACKGROUND

1. Field of the Invention

This invention is related to sensor attachments for robots.

2. Related Art

In the field of robotics, sensors are used extensively to learn about the robot's world and environment. This is even more important for mobile robots as the world they sense can change rapidly. Moving sensor platforms have been around for a long time. Moving sensor platforms include radar dishes, line scan cameras, cameras on a rotating base for "panning", and laser scanners. In the mobile robotics field, moving platforms have also been used, containing such sensors as laser scanners, sonar sensors, infrared sensors, and cameras. Cybermotion used a multi-sensor rotating sensor head in its SR-3 ESP robot models.

A human's head is a good example of a rotating sensor platform; we aim our head toward a sound we hear, for a closer look. Unfortunately, our neck has limited rotation capability.

SUMMARY OF DISCLOSED EMBODIMENTS

Some sensors are expensive, use substantial amounts of power, use a long form factor or occupy a large volume. Many sensors cover only a narrow field of view (FOV) and some sensors require periodic, involved calibrations and maintenance. Large sensors may not fit some robot designs, but could if the sensor parts could be distributed or folded in size, such as with optical paths.

A rotating sensor platform that can be scanned or aimed can also provide the ability to interact with the platforms environment. Additionally, "output" or reactive features can be incorporated, such as aiming a spot light, emitting a directed sound, mechanically moving an object or extending and operating a probe.

Many sensors are simply mounted in a fixed position, such as with the typical security video camera. This camera can only see what is in its FOV (field of view) unless it has a motorized steering mechanism. To provide coverage, other sensors are duplicated in various locations, such as a multitude of sonar sensors on a mobile robot. Some sensors do not fit the planned mounting space, such as sensors that require a long space for installation, or telescopic lenses mounted to a video camera being fitted into a humanoid robot head. Cost also limits sensor deployment, as some sensors are expensive, such as IR thermal cameras. Many rotating sensor types are available, but are not available as a rotary multi-sensor platform. Military aircraft use rotary multi-sensor platforms using sensors that are optical in nature and typically aimed forward or down and where price is not an issue.

For an example in mobile robotics, the Cybermotion SR-3 with ESP features a spinning sensor package located at the very top of the robot. This rotating sensor package typically consists of four sensors; two passive IR sensors, one flame-detecting sensor and one microwave sensor. This rotating sensor platform has several limitations such as no video capability, a very limited number of small sensors, no on-board computer processing, and minor sensor signal conditioning with dedicated electronics. The sensor signals are presented to a slip ring device where a sub-processor computer on the main chassis reads the data. This is not a true data transfer, as data can be lost and no local storage of the sensor values is available.

In addition, the chassis contains the fixed RPM sensor package drive motor, connected to a solid central axle shaft. The sensors are socketed, but require substantial disassembly to access the sensors. Overall, this design is not modular but is more integrated with the chassis, making repairs, calibrations and troubleshooting very involved. The Cybermotion scanner is capable of sensing within its intended design limits, but it is limited in capacity, function and scanning ability. Furthermore, the solid axle design using a chassis mounted drive motor and remote major electronics limits its installation for providing unobstructed sensor views to the very top of the robot. The fixed rotation rate and direction prohibits the ability to directionally scan or dwell in an area.

This invention provides a sensor platform that reduces the total sensor cost and expands the sensing ability with no sensor obstructions in a modular design utilizing local processing and control of the sensor platform while featuring a large internal diameter to provide the chassis with maximum interior volume for the supporting structure as well as for the traversal past the sensor platform of wires, mechanisms and equipment.

The invention has several distinct and independent advantages over the known prior art, including the ability to direct a sensor's sensing direction, such as to scan and survey an area. Modular construction provides for a simple connection to the chassis or framework as well as incorporating modular internal components. The local on-board or embedded internal computing capacity can process sensor data as well as to manage the sensor platforms positional control.

Features provided by this invention include:

a positionable sensor platform that can be built over a large diameter rotation axis. This provides a large diameter useful for the robots support structure, and locating other equipment and wires or pipes, etc.

a modular system which can be detached from the chassis or framework easily, facilitating construction, maintenance and calibrations.

a modular construction where sensors and "output" devices can be easily added.

expanding sensor coverage by a scanning process, thus magnifying the sensor's abilities and/or range by having direct control over the sensor platform's position and/or modes of movement.

local on-board sensor processing, as well as the local control of the sensor platform by using one or more embedded computers, reducing the overall system data traffic and/or allowing simplified power and data connections and cable installation. With local on-board computer(s), sensor signals can be digitized and processed locally. Data is stored for a short time and transferred to other systems. Lost or damaged sensor data is simply resent. Locally-processing the sensor data also eliminates the problems of adding additional sensors, as there is no need to add new wire runs in the chassis for each new sensor installed in the sensor platform.

a structure that permits long or bulky devices to be installed, where these devices can be "folded" or distributed into the ring's circumference. On a 70 cm diameter robot, this could allow up to 210 cm of length, or about 6 feet of length for optic paths.

tracking or monitoring a coaxial hybrid robot arm as the arm rotates about the robot's common centerline. The sensor platform can rotate or scan to lead or follow the rotating robot arm while the arm is moving or performing work.

A modular intelligent multi-sensor sensor platform was developed for mobile robots and other vehicles as well as applicable to sensor outposts or sentries. The modular intelligent multi-sensor sensor platform provides a directional sensing ability utilizing a multitude of sensors in a cost effective package.

BRIEF DESCRIPTION OF THE DRAWINGS

For a filler understanding of the nature and objects of the invention, reference should be made to the following detailed descriptions taken in connection with the accompanying drawings, in which.

DETAILED DESCRIPTION OF THE DISCLOSED EMBODIMENTS

Figure 1:
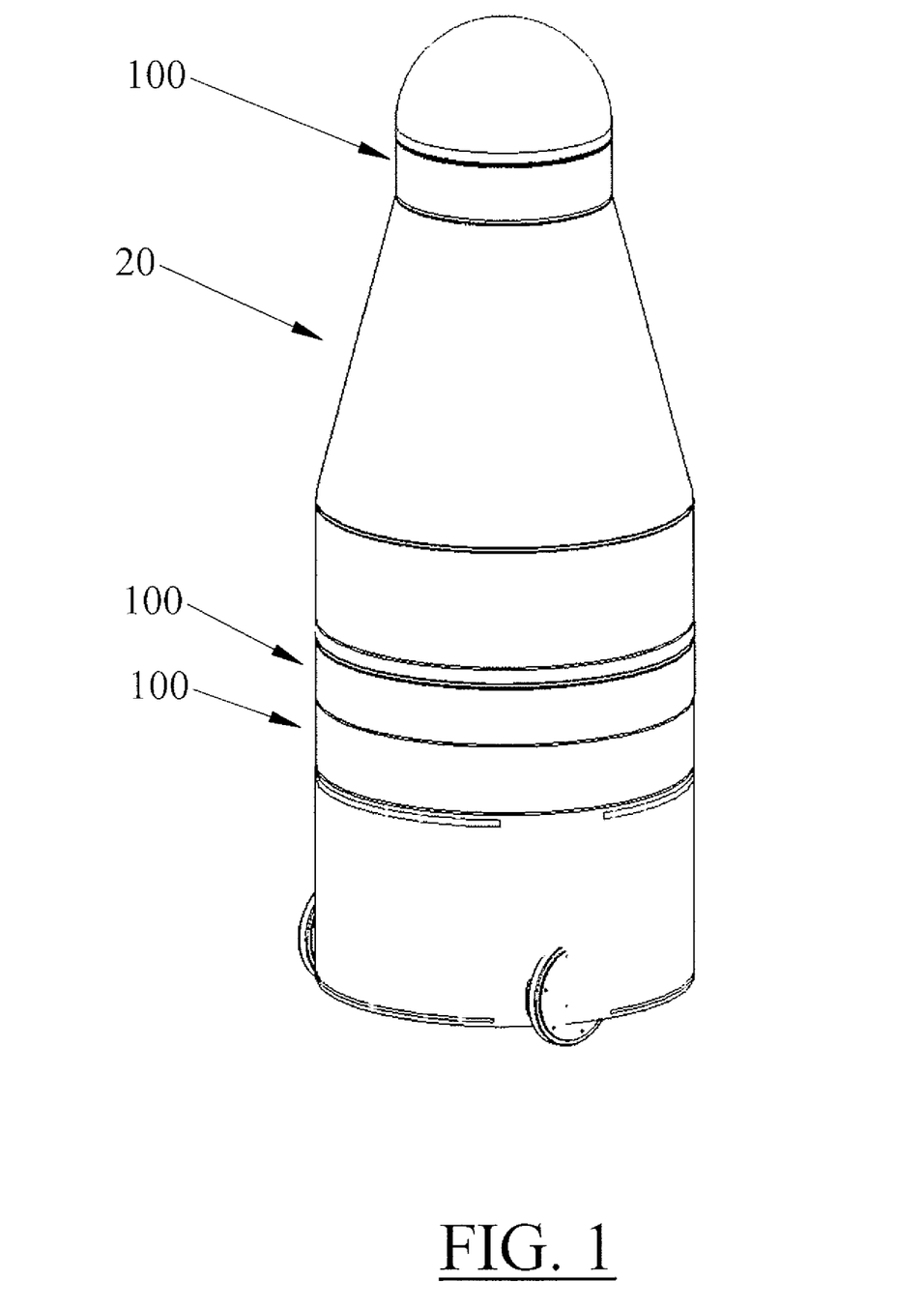
FIG. 1 is a perspective schematic view of a round robot with an exemplary embodiment of a sensor ring platform according to this invention.
Figure 2:
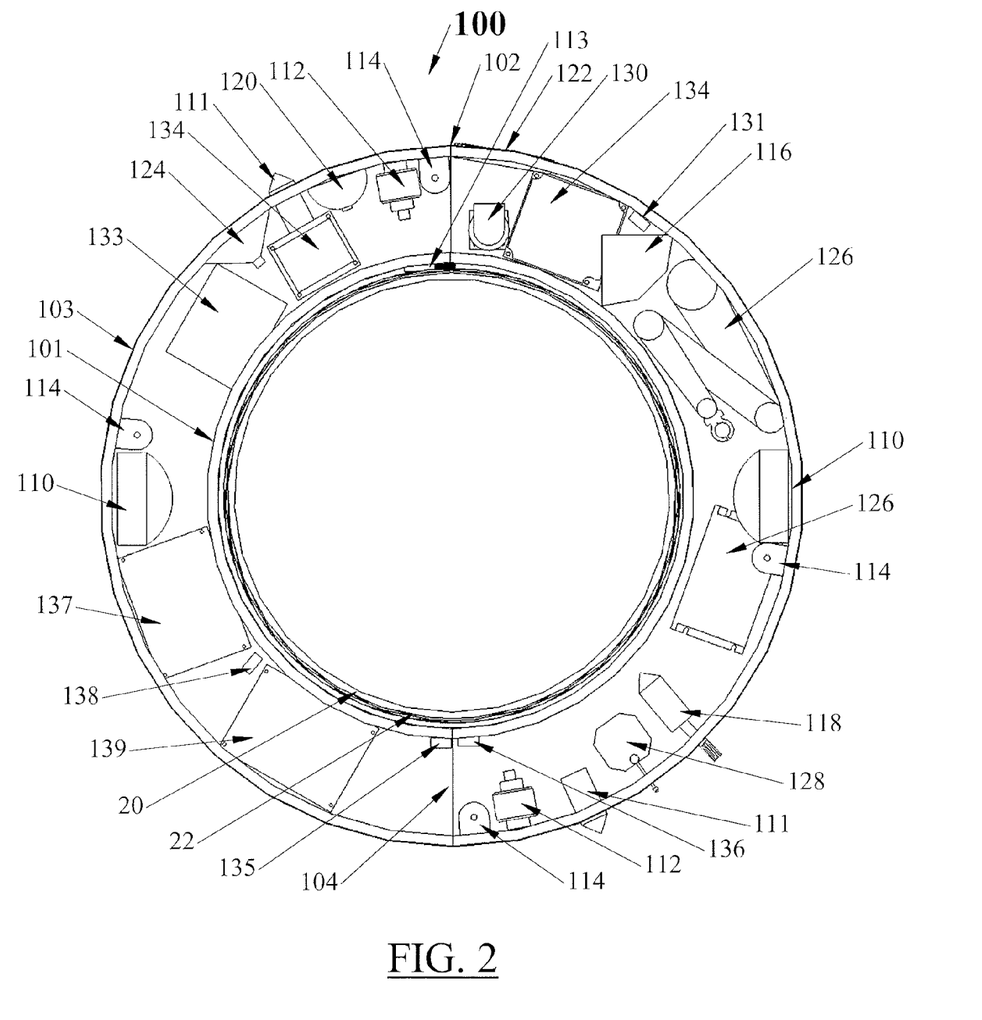
FIG. 2 is a top schematic view of the exemplary embodiment of the sensor ring platform of FIG. 1 and its components.

FIG. 1 shows a cylindrical shaped robot with an exemplary embodiment of a sensor ring platform 100 according to this invention. As shown in FIG. 1, in this exemplary embodiment, the sensor ring platform 100 is a hollow structure whose form is typically a ring, cylinder, donut, or hemisphere shape. In various other exemplary embodiments, such as that shown in FIG. 4, the form of the sensor ring is a flexible or segmented belt that rotates for use on a square or non-circular shape 100. As shown in FIGS. 1-4, the platform rotates about a central support structure tube or shaft 20 (the rotation axis). As shown in FIG. 2, the sensor ring platform 100 is typically circular in shape, allowing the platform to scan or rotate in a confined space. The sensor ring platform 100 contains sensors, computers and electronics with additional sensors installed as needed.

Figure 5:
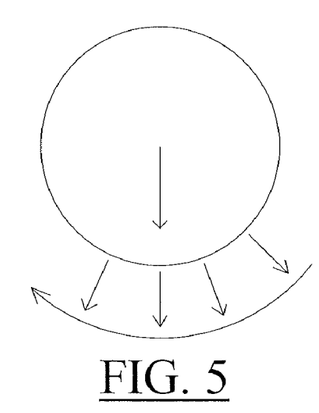
FIG. 5 is a schematic view of a first exemplary mode of operation showing the rotation of the exemplary embodiment of the sensor ring platform of FIG. 1.
Figure 6:
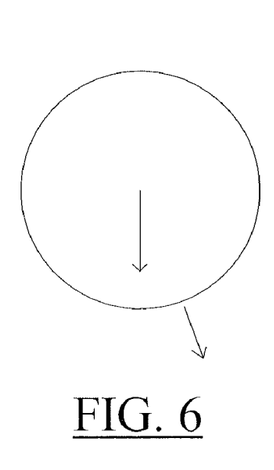
FIG. 6 is a schematic view of a second exemplary mode of operation showing a fixed position of the exemplary embodiment of the sensor ring platform of FIG. 1.
Figure 7:
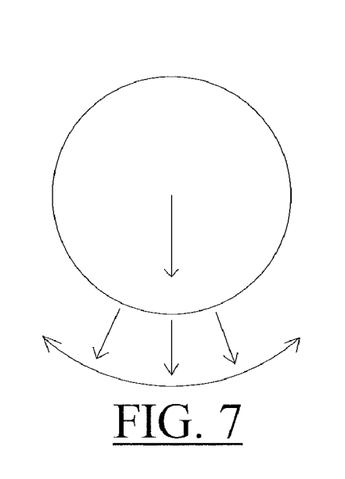
FIG. 7 is a schematic view of a third exemplary mode of operation showing a sector scan rotation of the exemplary embodiment of the sensor ring platform of FIG. 1.
Figure 8:
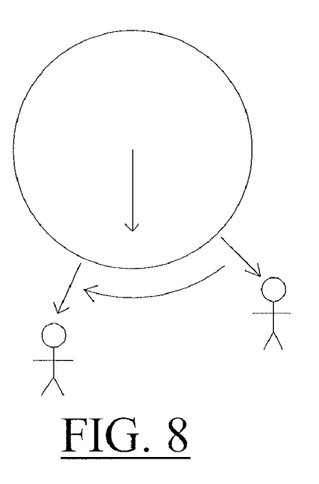
FIG. 8 is a schematic view of a fourth exemplary mode of operation showing the rotation required to track an object by the exemplary embodiment of the sensor ring platform of FIG. 1.

FIGS. 5-8 show various exemplary embodiments of different operation modes of the sensor ring platform. It should be appreciated that the different operation modes may be separately selectable or may work in conjunction with each other. As shown in FIG. 5-8, the rotational movements of the sensor ring platform are varied and can range from stationary, as shown in FIG. 6, to continuous 360+ degree rotations, as shown in FIG. 5, or even area scanned (sector scanned-back and forth) and directed movements as shown in FIG. 7. Some examples of the scanning modes of operation would be a fast circular scan, followed by a slow circular scan, with rescan sectoring on interesting areas. Step scans can dwell on a heading, such as move five degrees, stop, and scan, move five degrees, stop, scan and repeat. The scanning can also be a random search pattern, as in the case of the robot looking for something, jumping from heading to heading (the view location). As shown in FIG. 8, the sensor ring platform scanning can also be sensor driven, such as by analyzing the sensor data and moving to the heading of an abnormal sensor reading for detailed measurements, such as detecting a loud noise, and rotating the sensor platform to investigate.

As shown in FIG. 2, modularity features include the sensor ring platform module 100, which is capable of semi-operation as a self contained separate stand-alone unit. Internal platform modularity includes modular sub-components such as a rotation drive system 130, one or more sensors, the computer(s) or processor(s) 137, a power supply 134 and supporting electronics 139.

The sensor ring platform 100 requires a simple mechanical mounting, and minimal power and data communication connections. In various exemplary embodiments, the stationary chassis can form elements of the support structure.

Figure 3:
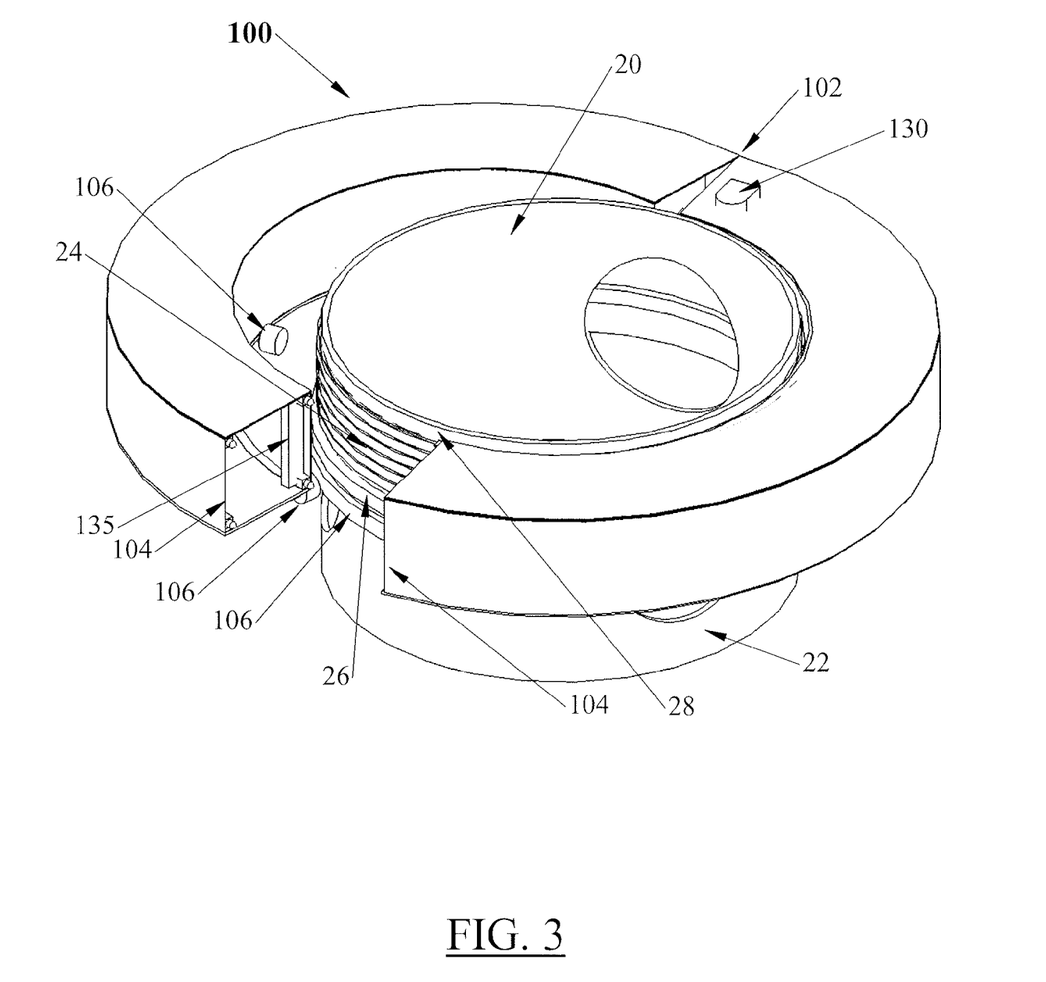
FIG. 3 is a perspective schematic view of the exemplary embodiment of the ring platform of FIG. 1 in the process of removal or installation.
Figure 4:
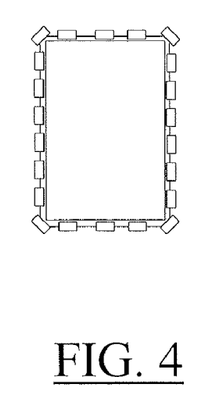
FIG. 4 is a top schematic view showing a flexible version of the sensor platform of FIG. 1.

As shown in FIG. 3, the sensor ring platform 100 is connected to a chassis 20, suspended and centered by, for example, a bearing interface, idler wheel arrangements, etc.

The sensor ring platform 100 is driven by one or more motors (actuators) 130 that rotate the sensor ring platform 100 relative to the chassis or support structure 20 it is installed on. The placement of the rotation motor 130 can be either on the chassis 20 driving the sensor ring platform 100, or in the preferred location within the platform 100. The rotation motor 130 acts on a stationary reaction linkage 26, such as an external gear, belt, chain, friction path, pulley or other mechanical connections, including a direct drive motor or other device. The motions of the platform 100 can be controlled locally using the embedded computer(s) or processor(s) 137. This location simplifies the wiring as well as allows local control of the drive for position control. In an exemplary embodiment, the sensor ring platform 100 uses an encoder 28 or 136, which is also provided on the position motor. In various exemplary embodiments, a cooling fan 131 may be needed to cool the electronics and the drive motor 130.

The sensor ring platform 100 can be removed and replaced as needed, for example, when a large number of complex sensors are installed. As shown in FIG. 3, in various exemplary embodiments, the sensor ring platform 100 can be detached and reattached easily (such as by a quick disconnect) as a module from the intended mounting or support structure 20 of the sensor ring platform 100, which may be beneficial for maintenance, upgrades and/or calibrations.

One method by which the sensor ring platform 100 can be removed from the central tube or support structure 20, is by splitting open the sensor ring platform 100 in sections, such as in half, with one edge 104 having a clear opening, and the other edge having a hinged arrangement 102. Furthermore, in various exemplary embodiments, the drive mechanism 130 should be located near the section break edges to provide ease of disassembly as well as ease in disconnecting or reconnecting the drive mechanism 130 coupling to the stationary drive portion 26. Once split, the sensor ring platform can be lifted out. This design does not require disassembly of the chassis or framework, as well as not requiring disconnecting any wires or cables.

In various exemplary embodiments, the sensor ring platform 100 contains the major components of the sensors, and one or more on-board or embedded computer(s) or processor(s) 137. In addition the sensor ring platform 100 may contain a rotation drive system 130, an uninterraptable power supply (UPS) 134 or 133 and/or other known or later-developed power supply.

Communication methods between the chassis 20 and the sensor ring platform 100 for data and commands can be of any type, such as wired, optical or radio wave connections. In various exemplary embodiments, the sensor ring platform 100 may provide a continuous 360 degrees of rotation. In various exemplary embodiments, a rotary coupler 24 and 135 is used for transmitting power and communication between the chassis or structure and the sensor ring platform 100. Such rotary coupler forms include using the typical slip ring designs, as well as any known or later-developed mechanical, electrical, optical, magnetic, radio wave, etc. rotational devices. Furthermore, this rotational coupler arrangement can be used to transfer other media within the robot, such as air samples for gas analysis, fire retardant, coolant, water, paint balls, etc. For exemplary embodiments where total rotations less than 360 degrees are desired, a flexible cable harness can also be used for data or media transport. In various exemplary embodiments, the rotary coupler or slip rings consist of two sections, with the fixed section 24 located on the stationary chassis, and the rotary section 135 located on the sensor ring platform. Rotation position data of the sensor ring platform is obtained by, for example, an electrical or optical encoder 28 and 136. Such encoders can be used separately or in any combination of incremental and/or absolute encoders. If implemented using an incremental encoder, a stricture or technique for locating the home or zero position of the sensor ring platform is needed, as well as a structure or technique for tracking the current incremental position count. In various exemplary embodiments, an absolute encoder is recommended for the sensor ring platform measurements.

In various exemplary embodiments, the sensor ring platform 100 is capable of operating when dismounted from its support structure 20. If positioned, for example, on a work bench, and if sensor ring platform movements were desired, a user may need to supply or duplicate the missing stationary components. If supplied with the matching stationary components, such as the rotational coupler section 24, the reaction gear or mechanism 26, the stationary encoder disk 28 and the suspension points for the rotation axis 106, the sensor ring platform 100 could be operated and perform many of its normal functions. If even simpler non-rotating testing were needed, the sensor ring platform 100 may only require the power and data communications connections.

In various exemplary embodiments, the sensor ring platform 100 collects, processes and arranges sensor data, in any directed heading. Local onboard (i.e., embedded within the sensor ring platform 100) computer(s) or processor(s) 137 will provide the data and control processing needs for the sensors, electronics, motion controllers, actuators and other features. In various exemplary embodiments, the workloads of the sensor ring platform 100 may necessitate additional embedded computers and/or processors to distribute the sensor data processing workloads and memory operations. In various exemplary embodiments, the data can be communicated to the overall data/control system of the robot, vehicle or system.

In the case where the main computer(s) and/or processor(s) of the robot or vehicle are installed in a remote location, or are too busy to catch sensor events and react in time due to time lags or are delayed by saturated information processing, the local on-board embedded computer(s) or processor(s) 137 can react. In various exemplary embodiments, the sensor readings are processed locally onboard the sensor ring platform 100 and are assigned the heading and rotation speed of the sensor ring platform 100 as well as an accurate time stamp. This sensor data preprocessing and analysis can result in some sensor data events triggering a local sensor ring platform response. Such triggered responses can result in actions that allow the robot a "subconscious" type of response. This operation is much like driving a car with your eyes jumping to the cars rear view mirror when a siren is heard behind you, while watching the road ahead.

This is an advantage as when a sensor "spots" something interesting, the motion of the sensor ring platform 100 can be stopped and relocated to take a closer look at the interesting or critical sensor reading without the delay required when only remote processing is available. One example of this phenomenon is discovering a high reading on a "flame" sensor, which causes a rescan of the area in question such as to determine if a fire was actually sensed or if the sensor reading was just a bad sensor reading.

Triggered sensor responses produce minimal delays in sensor monitoring but allow detailed sensor readings on demand. Note that the sensor ring platform cannot stop instantaneously, as the sensor ring platform requires time for acceleration and deceleration.

In various exemplary embodiments, the sensor data can be overlaid, combined or "fused", and any combination of raw or fused data can be used locally on the sensor ring platform 100 or transferred to an external location from the sensor ring platform 100. Sensor data can be collected using any method, such as polled, synchronous or asynchronous data transfer modes. In addition, the data is referenced to an accurate time, rotation position and rotation speed reference data stamps.

The data can be stored in such locations as a data array in memory or in a database table. Sensor data can also be "aligned", for example, as the sensor ring platform 100 rotates, sensors and sensor readings will sequence past the heading mark (i.e., the front or zero degree heading of the robot or vehicle), resulting in some sensor data readings that are delayed in time as the sensor ring platform 100 sweeps past that heading. For another example, for a stopped or stationary robot containing multiple sensors, as the sensor ring platform rotates, first a video camera 112 observes data at the heading or direction of interest, say ten degrees, followed in rotation for example, by a sonar sensor 114. Each reading at the ten-degree point has a different time stamp. Since the robot is not moving, there is no need to correct for the robot's velocity and position changes. The data can be synchronized simply by sorting by the position of the sensor ring platform.

In contrast, if the robot is moving, each sensor's field of view (FOV) reading for a given heading will occur at both a different time and location in space. In this case, the sensor data will need to be sorted and corrected or adjusted to take the robots motion into account. A time stamped data set logged from the robot's navigation system, including, for example, the robot's speed, the rate of chassis spin, and overall direction, may be used. An inertial measurement unit 116 embedded in the sensor ring platform 100 can also be used to provide data for this purpose.

Local sensor ring platform data storage limitations may prohibit the long term logging or archiving of the data collected in the sensor ring platform 100. In various exemplary embodiments, for storage, data is transferred to another computer or data storage medium located in the robot, vehicle or in an external location. Such data can include, for example, selected sensor readings, a data snap shot or a windowed data segment. A windowed segment of data can also be transferred as a "frame" similar to a video "frame", as the sensor data structure would contain similar data consisting of overlaid video and sensor data. Note that computer processing and data transfer rates may, at least in part, determine how many windowed segments of data or "frames per second" are transferred.

In order to function as a sensor platform, the sensor ring platform 100 should have a minimum number of external sensors installed. It is envisioned that the sensors are matched to the intended purpose and operational environment of the sensor ring platform 100. It should be appreciated that these variables may not apply to any internal sensors of the robot or vehicle, such as the rotation position encoders, the drive motor encoder, component temperature sensors, as well as miscellaneous amperage, voltage, and other embedded sensors. In various exemplary embodiments, the maximum sensor count installed is limited by such factors as, for example, the sensor cost, the available interior volume or physical space, the power requirements, and/or an overall heat load of the sensor ring platform.

As an example, consider the case of installing one expensive infrared thermal video camera 112, followed by several inexpensive sonar sensors 114 placed symmetrically in a pattern about the sensor ring platform. The usefulness and FOV of the thermal camera 112 are greatly expanded by its use in the rotating platform 100. Typical sensors used in robotics include, for example, tactile, ultrasonic sonar sensors, LIDAR, RADAR, and Video cameras.

The sensor ring platform 100 can incorporate a multitude of sensor types such as, for example:

i. Audio sensors: such as microphones and sonar sensors 114, ii. Optical and video sensors: such as UV, IR and visible light cameras 112 and sensors, LIDAR and other laser or optical systems, iii. Environmental sensors: such as temperature, air pressure, air velocity, humidity, dew-point, solar flux, $O_2$, $CO_2$, Hydrogen (gas leak), Air-born dust and other particulate matter levels, combustion products, various odors, etc., iv. Electromagnetic and electrostatic sensors: such as for electrostatic fields, electromagnetic fields, magnetic field measurements and defined radio waves (such as for wireless network detection and mapping, RFID identification and tracking), and radar, v. Other sensors: such as radiation detectors, wet floor detection, fingerprint and body fluid detector, inertial measurements (accelerometers and gyroscopes), GPS, etc., vi. Tactile sensors: such as mechanical switches, direct pressure sensors, piezoelectric sensors and capacitance touch sensors. External feelers 118 or whiskers, i.e., "fur", can also be implemented for close proximity tactile measurements as well as for measuring air currents.

It should be appreciated that, in general, the sensor ring platform 100 is not limited in what kinds of sensors can be mounted on it. As such, any desirable, known or later-developed sensor may be used with the sensor ring platform 100.

Figure 9:
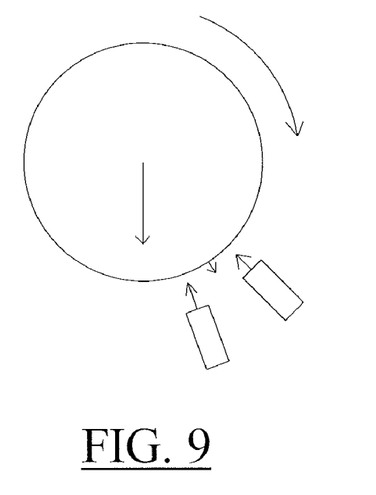
FIG. 9 is a schematic view showing one possible sensor ring platform calibration aid feature.

Sensor calibration and qualification can be enhanced and automated using the sensor ring platform 100. As shown in FIG. 9, when the robot is docked for such purposes as, for example, battery recharging, the sensor ring platform can be rotated to align with and connect to suitable calibration fixtures 210, 220 for each sensor's calibration needs.

For example the sensors can be presented to calibrate a first sensor by a first calibration fixture 210, with that sensor's readings taken, then the sensor ring platform 100 can rotate to calibrate a second sensor with a second calibration fixture 220, to obtain a second set of sensor readings, repeating if needed or to verify the calibrations.

In various exemplary embodiments, the data collection and processing of the sensor ring platform 100 desirably uses reference data. This reference data is used to synchronize sensor readings and to provide a sensor timeline. In various exemplary embodiments, the time reference data is obtained from a built-in accurate time source clock 138 where the computer time stamps each sensor reading. The position and rotation speed values of the sensor ring platform 100 are also added to the sensor's reading. This accurate time clock can be a separate module in the sensor ring platform, such as the time source clock 138, or combined with the embedded computer(s) or processor(s) 137. Using high resolution position sensors, such as an absolute encoder 28 and 136, can provide the position data. In addition, an absolute encoder enables a faster startup as it can directly read the location of the sensor ring platform without going through a homing procedure. The rotation speed of the sensor ring platform 100 is also used to evaluate sensor data quality and sensor data timing during the rotation of the sensor ring platform.

The large internal diameter of the sensor ring platform 100 provides room inside the sensor ring platform 100 for large sensors, such as optical systems, which may be needed to obtain high quality images using such techniques as, for example, folded or distributed optics, that includes mirrors, lenses and beam splitters. These optical splitters can provide a common bore-sighted or collimated image that is processed between split optical channels for such sensors as visible and IR thermal cameras.

Figure 10:
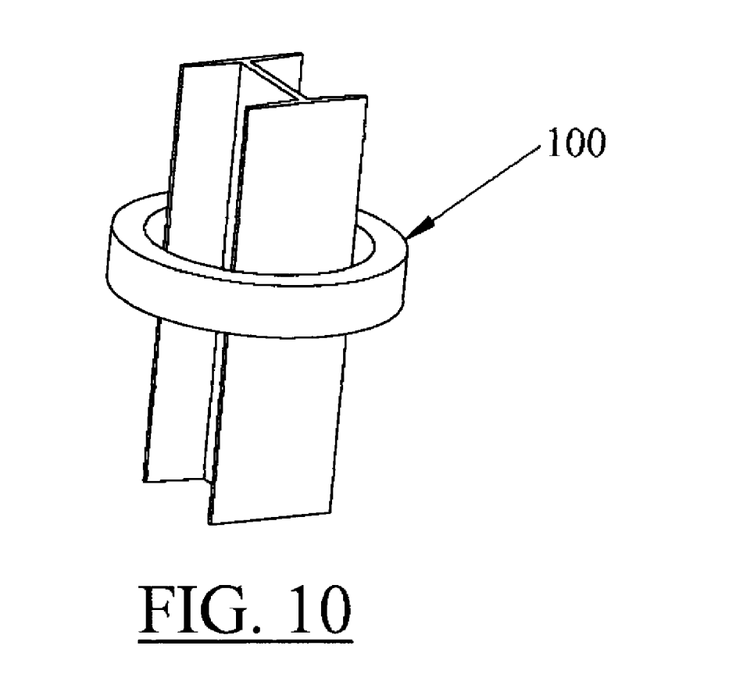
FIG. 10 is a schematic view of the exemplary embodiment of the sensor ring platform of FIG. 1 mounted on a structural I-beam.

In addition, the large internal diameter of the sensor ring platform 100 allows the chassis or support structure 20 to have a large diameter 22. As shown in FIG. 10, this is useful, for example, for mounting the sensor ring platform 100 on an I-beam, as the I-beam can remain unmodified with the sensor ring platform 100 fitting around the entire I-beam. Another case is for the interior chassis 20, where the large interior diameter of the sensor ring platform 100 provides the chassis 20 with a matching large exterior diameter 22 in the region of the sensor ring platform 100. This provides the chassis 20 with a stiffer structure, and room for other equipment or assemblies to be located in. In addition, this large interior volume allows the easy routing of wires, pipes and other mechanisms from the bottom to the top of the robot or vehicle.

Since the sensor ring platform 100 rotates, the dynamic balance of the sensor ring platform 100 can be enhanced by relocating heavy components such as the UPS batteries 133 to reduce any unbalanced wobbles or vibrations and unbalanced bearing loads. If installed, the inertial measurement system 116, including accelerometers and gyroscopes, can measure these vibrations and the local onboard computer can adjust or limit the rotation speeds to minimize these vibrations. To isolate the robot or vehicle-induced vibrations, the sensor ring platform 100 can use cushioned bearings 106 or fixtures to reduce the shocks, bumps and vibrations felt by the robot or vehicle and to provide for a quiet operation.

In various exemplary embodiments, the sensor ring platform 100 contains an energy management system for its power consumption and energy reserves. This energy management system may also contain a local battery-assisted uninterruptable power supply, or "UPS" 133 or 134 that is fed from a power source located on the chassis or structure. Power is delivered to the sensor ring platform from the rotary coupler 24 and 135, and is routed through the power management controls 139, which include switchable power converters 134, power-monitoring circuits and the uninterruptable power supply (UPS) 133 or 134.

The chassis power feeds the battery-assisted power supply, or UPS 133 or 134, and the UPS 133 or 134 supplies filtered power when the power source is not delivering sufficient power, or if the chassis power is noisy or out of tolerance. With this power conditioning feature built into the sensor ring platform 100, constant clean power for the computer(s) or processor(s) and sensors can be provided, thereby reducing, and ideally eliminating, power-related computer reboots and inaccurate sensor readings. In addition, the UPS system 133 or 134 serves as a sink for any sudden heavy current draws or voltage spikes, such as the high-speed reversal of the platform motor 130 or the toggling of an output device like a spotlight. The UPS system 133 or 134 typically includes electronics 134 and energy storage devices 133 such as a set of batteries or capacitors or other energy storage devices.

In various exemplary embodiments, overall robot energy management commands sent to the sensor ring platform 100 are given priority over internal platform commands. Such commands include to "power off", return to "full power", go to "sleep", or "awake", and to "recharge", the battery or "conserve energy". Combinations can also be designated, such as naming a specific sensor or sensor group for energy management. The thermal management of the sensor ring platform 100 may also control some sensors' energy use, such as turning off a hot sensor. As an example, the sensor ring platform 100 can be commanded to go into a light sleep mode, with no platform rotations, reduced processor speeds and logging only triggered image and audio events found beyond a set threshold of levels, much like a reactive security camera system.

The power management system also receives chassis or robot E-Stop commands, as well as having one or more manual E-Stop buttons or switches 111. The E-Stop event disconnects the UPS 134 or 133 and the chassis power inside the sensor ring platform 100 and can send out an E-Stop event message. In addition, in various exemplary embodiments, the sensor ring platform 100 uses an anti-static or ground brush 113 to keep any charges or stray voltages grounded. This helps insure a safe operation as well as cleaner sensor readings and possibly avoids bearing damage due to stray voltages.

In various exemplary embodiments, the sensor ring platform 100 can also interact with its environment, such as with reactive or "Output Devices". If the sensor ring platform 100 is equipped with such devices, such as, for example, lights 120, speakers 124, information displays 122, small robot arms 126, mechanical mechanisms, material ejectors 128, etc. it can interact with its environment.

Displays can provide information, such as statistics, selected data readings and image displays to a user or person near the sensor ring platform 100. An array of lights, such as colored LEDs, can create rotating text displays, colored lights for alerts, warnings, status, illumination and the like. A speaker 124 also allows the sensor ring platform 100 to emit a directed sound.

It is envisioned that, in various exemplary embodiments, the sensor ring platform 100 will use mechanical sample acquisition, such as feelers, scrapers, brushes 118 and liquid or air samples. These devices can be incorporated into the sensor ring platform 100.

Other active devices can include a small robot arm 126 mounted on or inside the sensor ring platform 100. Such an arm 126 may be limited in features and capacity but the arm 126 could be used in such cases as sample collections or for object manipulation for sensor readings. The sensor ring platform 100 can also house an output projector system 128, such as a fire retardant mister, water sprayer, a paint ball ejector, or other projectile launchers. With the ability to rotate for positional control, as well as sensor readings for determining the aiming, the projectile's path can be computed and released.

In various exemplary embodiments, multiple sensor ring platforms 100 can be installed on a single robot chassis and can provide additional sensing capacity and coverage. The multiple sensor ring platforms 100 can communicate with each other to coordinate sensor monitoring and data readings as well as performing detailed target analysis.

FIG. 1 shows an example of multiple sensor ring platforms 100 installed in a stacked configuration. In various other exemplary embodiments, one or more sensor ring platforms 100 may be positioned close together and/or back to back. As shown in FIG. 1, two or more sensor ring platforms 100 may be located at distant or different locations in the robot's or vehicle's chassis, such as located at the bottom and top of a robot or vehicle. These sensor ring platform installations and cooperation between multiple sensor ring platforms 100 may be needed to observe transient or moving phenomena, as well as to work together to navigate in tight locations.

In various exemplary embodiments, the sensor ring platforms 100 are capable of isolated operation for use as in performing independent or divergent observations and tasks. For example, one or more sensor ring platform(s) 100 can cooperatively participate with other systems or subsystems such as for coordinating the robot's arms. As an example using two sensor ring platforms 100, a first sensor ring platform 100 is used for robot navigation, such as for moving in a hallway, while a second sensor ring platform 100 is useful for observing and communicating to the robot's arms while performing a task.

Figure 11:
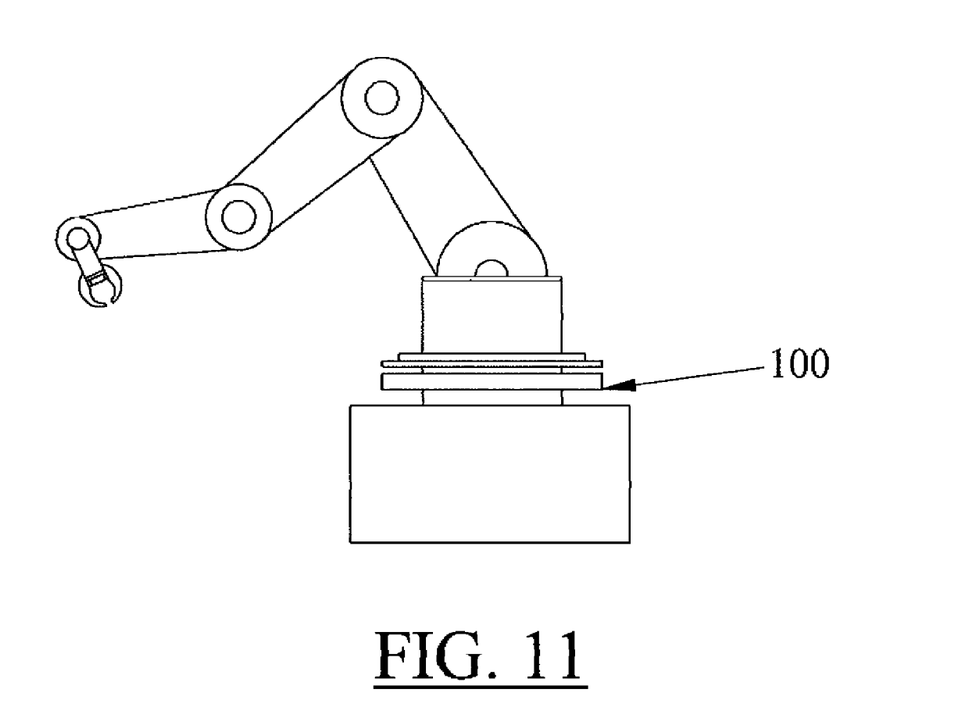
FIG. 11 is a schematic view of the exemplary embodiment of the sensor ring platform of FIG. 1 mounted below a typical industrial robotic aim.

The sensor ring platform 100 can rotate with a robot arm, or arms, as they move, such as when following a modular hybrid snake arm as it rotates around the co-axial body of the robot or vehicle while sharing sensor data between these subsystems. As shown in FIG. 11, another example is of the sensor ring platform 100 being directed to examine a set location if another subsystem requests it, such as the industrial robot arm requesting to see an object in order to pick it up.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:

1. A sensor ring platform mountable onto a robot having a frame, the sensor ring comprising:
   a ring-shaped platform provided around the frame of the robot;
   a drive system usable to rotate the platform around the frame; and logic control circuitry, wherein:
the sensor ring platform includes at least two sensor types; and
the logic control circuitry controls at least one of at least one sensor and the drive system in response to output signals from at least one sensor.

2. The sensor ring platform of claim 1, wherein the logic control circuitry comprises at least one of at least one embedded computer and at least one logic processor and at least one energy management system.

3. The sensor ring platform of claim 1, wherein the ring-shaped platform comprises a plurality of sections coupled with each other, at least two of the sections being hingedly coupled to each other and at least two of the sections being from each other, and at least one section further comprising a slip ring electrical connection usable to transmit electrical signals between the sensor ring platform and the frame of the robot while the sensor ring platform is rotating.

4. The sensor ring platform of claim 1, wherein the drive system comprises a motor associated with the platform and a gear on the robot.

5. The sensor ring platform of claim 4, wherein the motor associated with the platform is mounted in the platform.

6. The sensor ring platform of claim 4, wherein the motor associated with the platform is mounted on the platform.

7. The sensor ring platform of claim 1, wherein the logic control device is capable of receiving signals from at least one of the at least two sensors and altering the drive system rotation in response to the received sensor signals.

8. The sensor ring platform of claim 1, wherein the at least one sensor comprises at least one sensor mounted in the platform.

9. The sensor ring platform of claim 1, wherein the at least one sensor comprises at least one sensor mounted on the platform.

10. A robot, comprising:
a frame;
a ring-shaped sensor platform provided around the frame;
a drive system usable to rotate the sensor platform around the frame; and
logic control circuitry, wherein:
the sensor platform includes at least two sensor types; and
the logic control circuitry controls at least one of at least one sensor and the drive system in response to output signals from at least one sensor.

11. The robot of claim 10, wherein the logic control circuitry comprises at least one of at least one embedded computer and at least one logic processor and at least one energy management system.

12. The robot of claim 10, wherein the sensor platform comprises a plurality of sections coupled with each other, at least two of the sections being hingedly coupled to each other and at least two of the sections being from each other and at least one section further comprising a slip ring electrical connection usable to transmit electrical signals between the sensor ring platform and the frame of the robot while the sensor ring platform is rotating.

13. The robot of claim 10, wherein the drive system comprises:
a motor associated with one of the sensor platform and the frame; and
a gear associated with the other of the sensor platform and the frame.

14. The robot of claim 13, wherein, when the motor is associated with the sensor platform, the motor is mounted in the sensor platform.

15. The robot of claim 13, wherein, when the motor is associated with the sensor platform, the motor is mounted on the sensor platform.

16. The robot of claim 10, wherein the logic control device is capable of receiving signals from at least one of the at least two sensors and altering the drive system rotation in response to the received sensor signals.

17. The robot of claim 10, wherein the at least one sensor comprises at least one sensor mounted in the sensor platform.

18. The robot of claim 10, wherein the at least one sensor comprises at least one sensor mounted on the sensor platform.

19. A sensor platform mountable onto a robot having a frame, the sensor platform comprising:
a flexible platform provided around the frame of the robot;
a drive system usable to rotate the flexible platform around the frame; and
logic control circuitry, wherein:
the sensor platform-includes at least two sensor types; and
the logic control circuitry controls at least one of at least one sensor and the drive system in response to output signals from at least one sensor.

* * * * *